United States Patent [19]

Deview

[11] Patent Number: 5,000,515
[45] Date of Patent: Mar. 19, 1991

[54] VARIABLE DENSITY FOAM VEHICLE SEAT

[75] Inventor: Gregory E. Deview, Ypsilanti, Mich.

[73] Assignee: Hoover Universal, Inc., Plymouth, Mich.

[21] Appl. No.: 310,352

[22] Filed: Feb. 14, 1989

[51] Int. Cl.⁵ ................................................ A47C 7/20
[52] U.S. Cl. ....................... 297/452; 264/45.1; 264/46.6; 297/459; 297/DIG. 1; 297/DIG. 2
[58] Field of Search ......... 297/452, 459, 460, DIG. 1, 297/DIG. 2; 264/45.1, 46.5, 46.6

[56] References Cited

U.S. PATENT DOCUMENTS

| | | | |
|---|---|---|---|
| 3,112,987 | 12/1963 | Griffiths et al. | 297/DIG. 1 X |
| 3,161,436 | 12/1964 | Hood | 297/DIG. 1 X |
| 3,257,149 | 6/1966 | Fruchte et al. | 764/45.1 X |
| 4,579,389 | 4/1986 | Shimbori et al. | 297/DIG. 1 X |
| 4,607,887 | 8/1986 | Vail | 297/459 X |
| 4,608,213 | 8/1986 | Kurumizawa | 264/45.1 |
| 4,755,411 | 7/1988 | Wing et al. | 297/DIG. 1 X |
| 4,923,746 | 5/1990 | Balmisse et al. | 264/45.1 X |

FOREIGN PATENT DOCUMENTS

| | | | |
|---|---|---|---|
| 240388 | 10/1987 | European Pat. Off. | 297/452 |
| 3136044 | 3/1983 | Fed. Rep. of Germany | 297/DIG. 1 |
| 1233513 | 10/1986 | Japan | 297/452 |
| 3176113 | 7/1988 | Japan | 297/452 |
| 2144071 | 2/1985 | United Kingdom | 297/452 |

Primary Examiner—Peter R. Brown
Attorney, Agent, or Firm—Harness, Dickey & Pierce

[57] ABSTRACT

A vehicle seat assembly having a molded foam cushion body and a pair of molded foam bolster bodies covered by a cover member which is bonded to the cushion body and the bolsters during molding. The cushion body foam is poured in place onto a portion of the cover member and the foam for the bolster bodies is poured in place adjacent the cushion body preferably at the same time. The bolster bodies can thus have a density differing from the foam cushion body to provide differing deflection characteristics in the bolsters than in the cushion body.

3 Claims, 3 Drawing Sheets

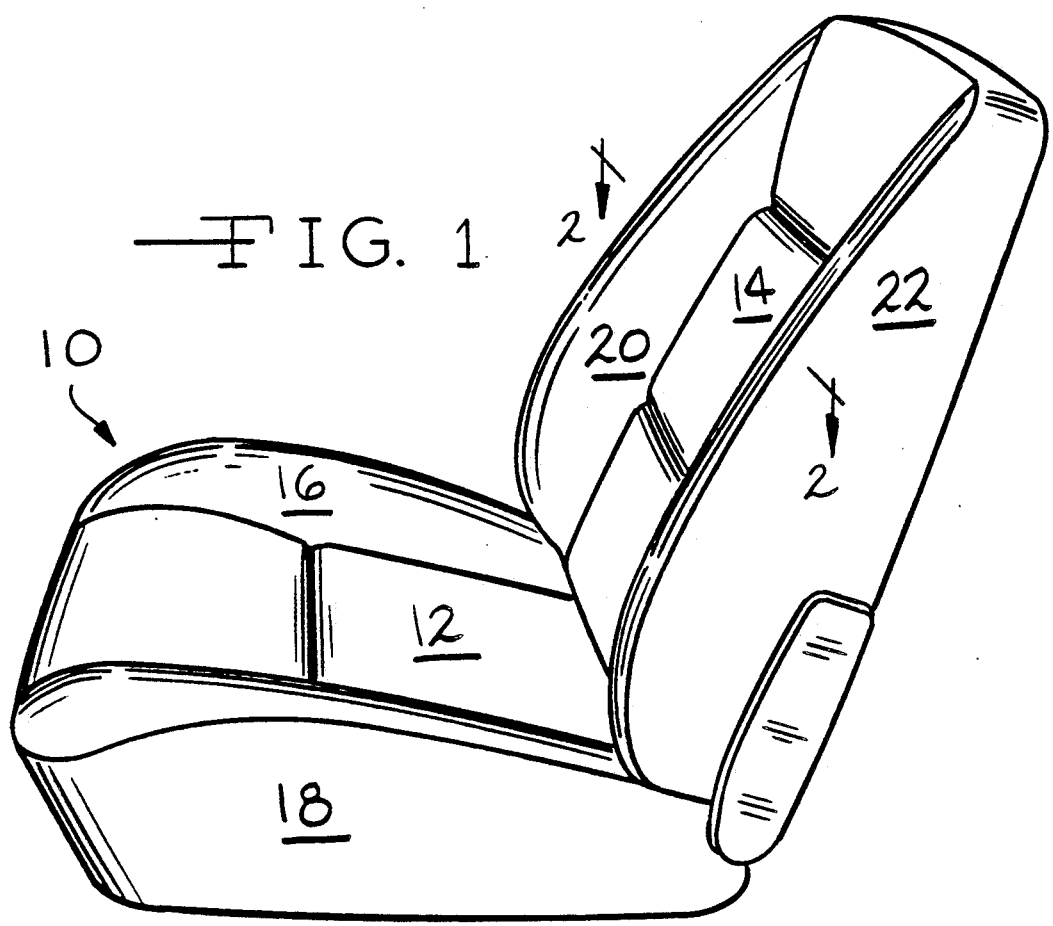
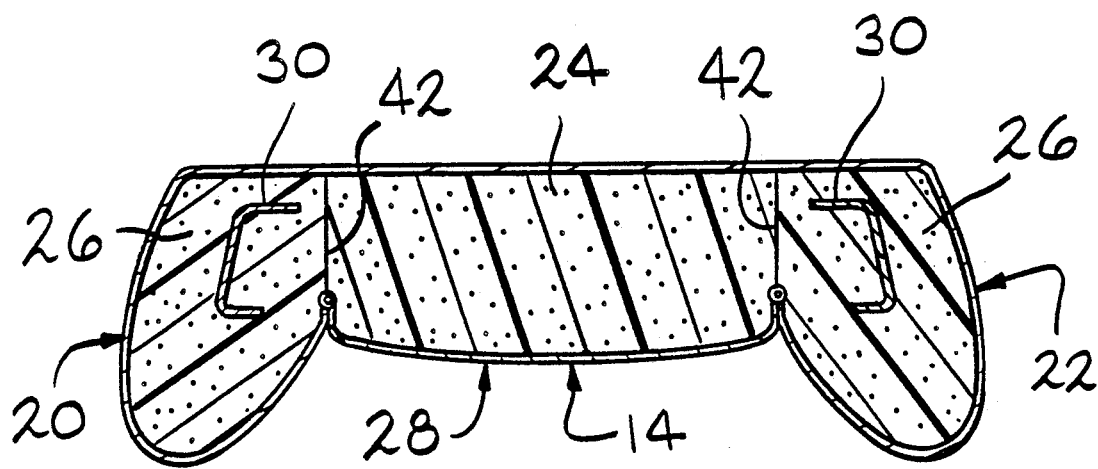

VARIABLE DENSITY FOAM VEHICLE SEAT

BACKGROUND AND SUMMARY OF THE INVENTION

This invention relates generally to vehicle seat assemblies and more particularly to the formation of a vehicle seat and back having a foam cushion molded in place onto a seat cover.

One method for forming a vehicle seat cushion having a molded in place foam cushion bonded to a cover member having a predetermined shaped is disclosed in U.S. patent application Ser. No. 205,929, filed June 13, 1988, entitled "Vehicle Seat Assembly With Pour In Place Foam Body" and assigned to the assignee of the present invention. This method is basically the formation of a foam cushion body within a cover member by placing the cover member into a mold cavity having a predetermined shape and then pouring an expandable foam into the cavity, allowing the foam to expand and solidify thus forming the foam cushion. This method of constructing a vehicle seat or back is desirable where a seat cushion having a single density is utilized.

An additional set of fabrication steps is required for vehicle seat assemblies having cushions and bolsters positioned to the side of the cushion. Conventionally, separate bolster cushions are formed and covered with a fabric cover and then secured together by means of a frame or by sewing the covers together so as to form an integrated seat and/or cushion assembly.

It is an object of the present invention to simplify the formation of a vehicle seat assembly having a load bearing cushion and deflectable bolster cushions on either side of the load bearing cushion by molding in place both the load bearing seat cushion and the bolster cushions within a single seat or back cover member.

It is another object of the present invention to provide a vehicle seat or back cushion for a vehicle seat assembly having bolster cushions of a different density than the load bearing seat or back cushion so as to provide desired improved rigidity and deflectability to the bolsters.

It is a still further object of the present invention to provide a vehicle seat assembly having bolsters and load bearing cushions having deflectable frame members embedded therein to limit the deflection of the bolsters.

Further benefits and advantages of the present invention will become apparent to those skilled in the art to which this invention relates from the subsequent description and the preferred embodiments and the appended claims taken in conjunction with the accompanying drawings.

BRIEF DESCRIPTION OF THE DRAWINGS

FIG. 1 is a perspective view of a vehicle seat formed in accordance with the present invention;

FIG. 2 is a sectional view of the vehicle seat shown in FIG. 1 taken along the line 2—2;

DETAILED DESCRIPTION OF THE INVENTION

Figure 3:
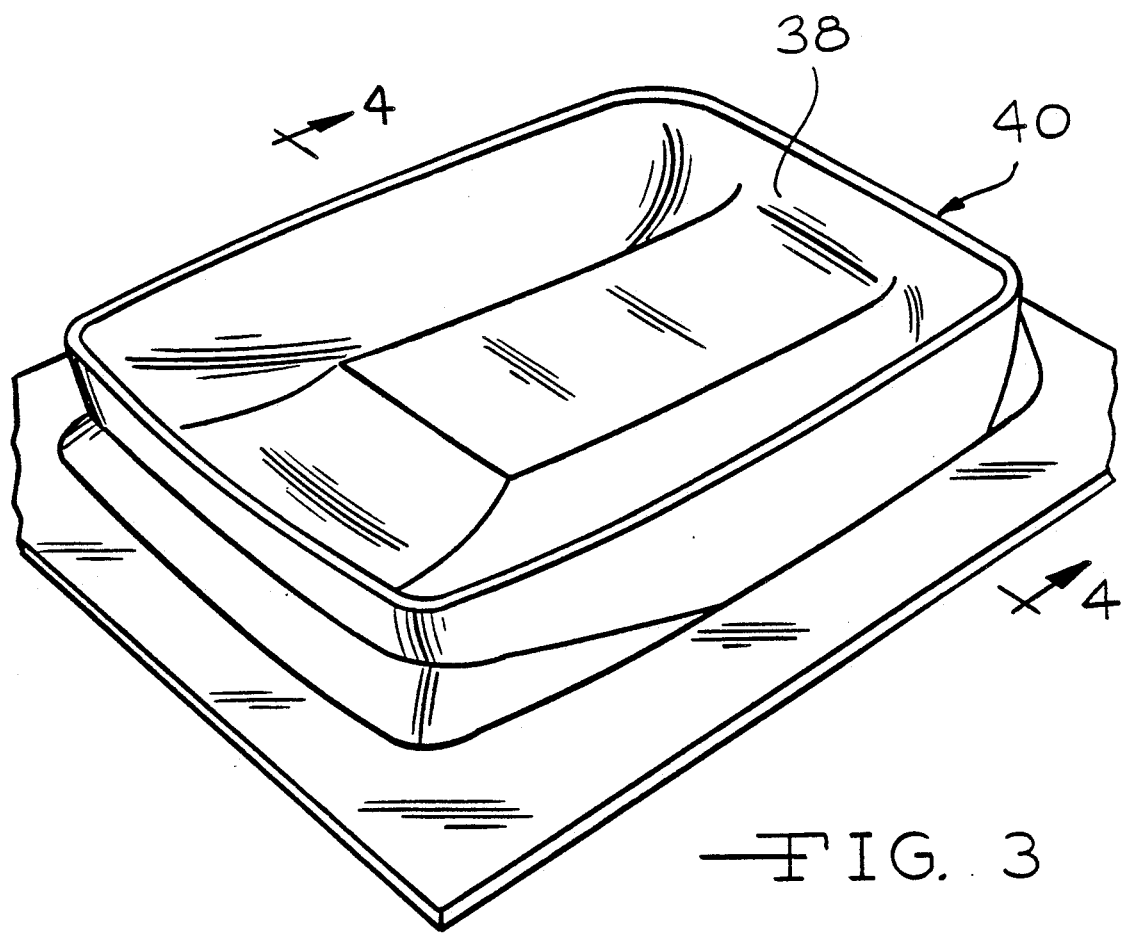
FIG. 3 is a perspective view of a mold for forming a portion of the vehicle seat shown in FIG. 1.

Turning now to the drawing, a vehicle seat assembly 10 according to the present invention is illustrated in FIG. 1. The vehicle seat assembly 10 includes load bearing seat cushion 12 and load bearing back cushion 14. Seat cushion 12 is surrounded by side bolsters 16 and 18. Similarly, back cushion 14 is sandwiched by side bolsters 20 and 22.

Bolsters 16 and 18 and 20 and 22 are preferably formed of a foam material having a higher density than the seat and back cushions 12 and 14, respectively. The higher densities of the bolsters provides an improved degree of stability in cradling the vehicle occupant in the vehicle seat assembly 10 while still allowing limited deflection of the bolsters as the occupant moves around in the vehicle seat.

The vehicle seat and back are formed by the same pour in place method as described below. Therefore, the following description applies interchangeable to the seat structure or the back structure.

The vehicle seat or the vehicle back includes a central foam cushion 24 and side foam bolsters 26 molded in place, preferably at the same time, within a vehicle seat cover 28 as illustrated in FIG. 2. Also embedded within the foam cushion 24 and bolsters 26 may be a flexible frame 30 which can be adjustable to provide a range of lumbar support as well as provide variation in the flexibility of the side bolsters depending upon the rigidity of the frame structure 30 itself.

Figure 4:
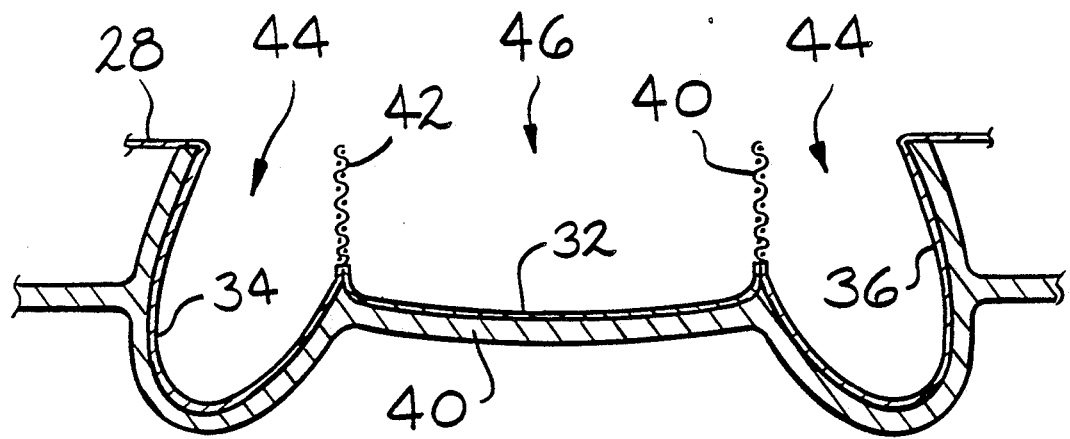
FIG. 4 is a sectional view of the mold taken along the line 4—4 in FIG. 3.

The seat or back of the vehicle seat assembly 10 according to the present invention is formed by placing a seat cover member 28 which has a cushion portion 32 and a pair of bolster portions 34 and 36 into a mold cavity 38 in mold 40. The margin between the cushion portion and each of the bolster portions includes a barrier strip 42 sewn to the seat cover 28 such that when the cover 28 is stretched onto the mold 40, the barrier strips 42 form vertical partitions creating a pair of separate bolster cavities 44 on either side of the cushion cavity 46 as shown in FIG. 4.

The barrier strips 42 may be formed of a cloth fabric material, a polyethylene sheet, or even a perforated webbing, depending upon the amount of rigidity the barrier desired strips 42 are to exhibit once incorporates between the cushion 24 and the bolsters 26. In addition, the structural frame 30 may be supported from the mold lid so as to project into the bolster and the cushion cavities 44 and 46. This allows the expanding foam to envelope the frame 30 during pouring in place which provides additional rigidity and support to the assembly.

Once the cover is placed into the mold cavity and either pressed or vacuum drawn into conformity with the predetermined interior configuration of the mold, a mold lid 48 is installed to close the mold assembly. Separate mold passages 50 and 52 lead through the mold lid to the three cavities formed within the closed mold. A first expandable foam material is injected through passage 50 into the center cavity 46 to form the load bearing cushion section, and a second expandable foam is injected through the second set of passages 52 into the bolster cavities. The injection of foam material may be simultaneous or staggered. The expandable foams may be of differing densities and hence result in different stiffness and deflection characteristics in the completed bolsters of vehicle seat cushion assembly 10.

Figure 5:
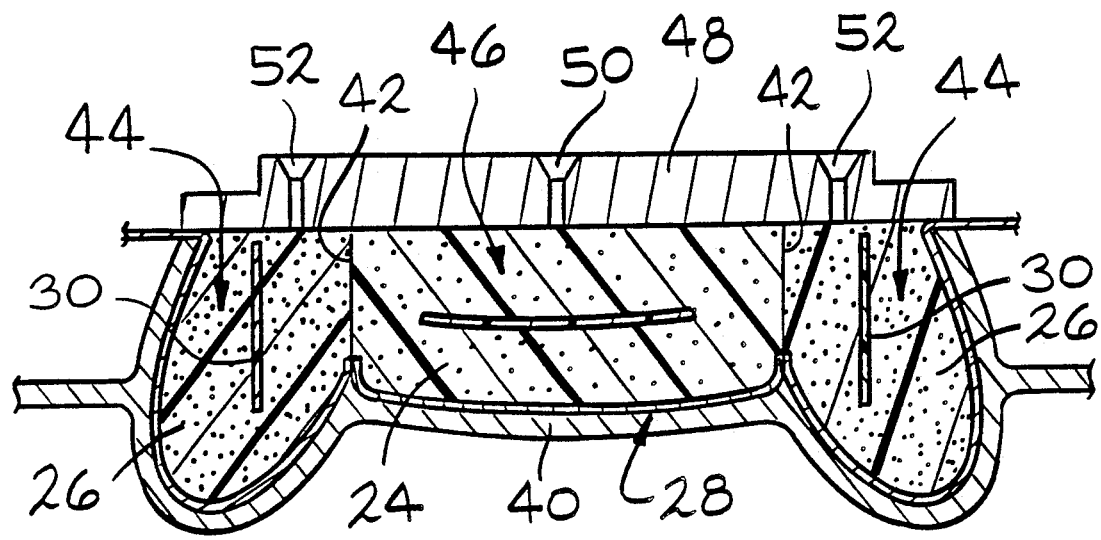
FIG. 5 is a sectional view of the mold shown in FIG. 4 with the mold lid in place and the vehicle seat back formed therein.
Figure 6:
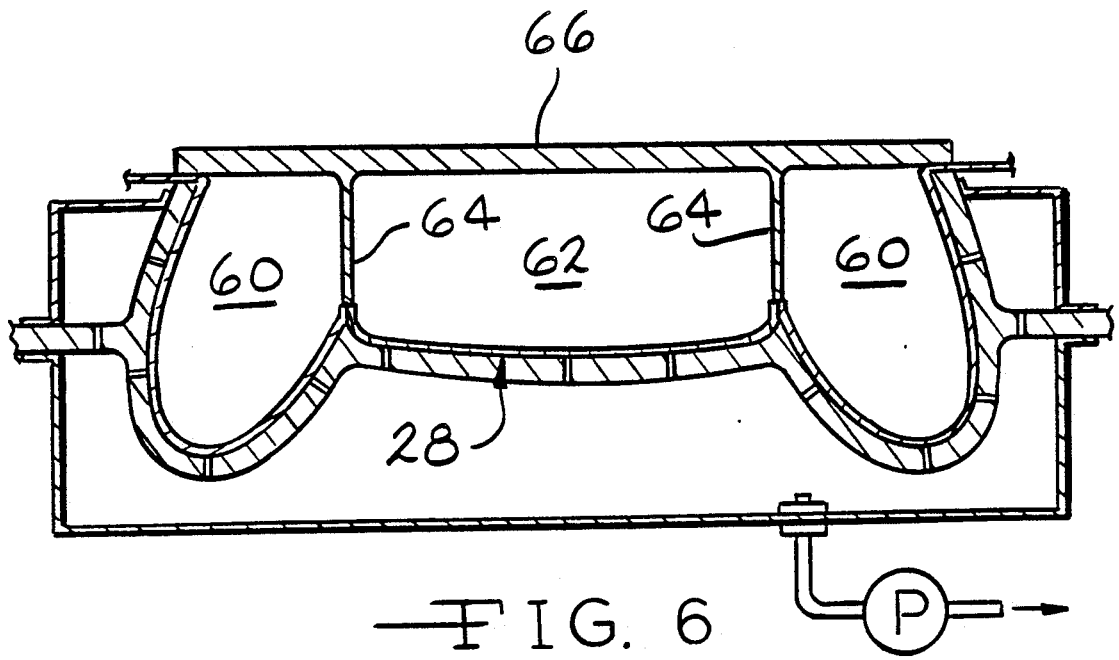
FIG. 6 is an alternative embodiment of the mold utilized in the present invention.

An alternate embodiment of the mold assembly that may be utilized in the present invention is illustrated in FIG. 6. In this embodiment, partitions between the bolster cavities 60 and central cavity 62 are provided by downwardly projecting ribs 64 in the mold lid 66 rather than requiring the barrier strips 42 in the cover 28 as shown in FIGS. 4 and 5. In this embodiment, the seat cover member 28 may be a single formed piece of material rather than having the barrier strips 42 sewn to the margins between the bolsters 26 and the vehicle seat cushion portion 24. This alternate embodiment has the additional advantage that the bolsters so formed may be separately articulated as there is no bonding of the bolsters to the cushion. The bolsters may be supported internally by an adjustable frame or by an externally mounted articulating structure.

While the above constitutes the preferred embodiment of the present invention, it will be appreciated that the invention is susceptible to modification, variation and change without departing from the proper scope or fair meaning of the accompanying claims.

What is claimed is:

1. A vehicle seat assembly comprising:
   a cover member having a load bearing cushion portion and at least one bolster portion adjacent said cushion portion,
   a cushion body having a first density and being formed from foam poured in place against said cushion portion,
   at least one bolster body having a second density and being formed from foam poured in place against said bolster portion, and
   means for establishing a barrier to define said cushion body from said bolster body, said barrier means being distinct from said cover member, said barrier means including a strip of material secured to said cover member and substantially separating said foam of said cushion body from said foam of said bolster body during the formation thereof, said barrier means thereby remaining in said seat assembly after the formation of said cushion and bolster bodies.

2. The assembly according to claim 1 wherein said cover member includes a pair of bolster portions sandwiching said cushion portion therebetween and a pair of bolster bodies poured in place onto said bolster cover portions, said second density being greater than said first density to provide a seat assembly having relatively stiff bolsters and a softer cushion therebetween.

3. The assembly according to claim 1 wherein said barrier means prevents said foam of said cushion body from bonding with said foam of said bolster body.

* * * * *